(12) United States Patent
Kulshreshtha et al.

(10) Patent No.: US 12,049,552 B2
(45) Date of Patent: *Jul. 30, 2024

(54) POLYOLEFIN COMPOSITION PROVIDING IMPROVED CONTRAST OF LASER MARKS

(71) Applicant: BOREALIS AG, Vienna (AT)

(72) Inventors: Bhawna Kulshreshtha, Vienna (AT); Denis Yalalov, Stenungsund (SE); Francis Costa, Linz (AT)

(73) Assignee: BOREALIS AG, Vienna (AT)

( * ) Notice: Subject to any disclaimer, the term of this patent is extended or adjusted under 35 U.S.C. 154(b) by 138 days.

This patent is subject to a terminal disclaimer.

(21) Appl. No.: 15/733,971

(22) PCT Filed: Jun. 12, 2019

(86) PCT No.: PCT/EP2019/065371
§ 371 (c)(1),
(2) Date: Dec. 1, 2020

(87) PCT Pub. No.: WO2019/243134
PCT Pub. Date: Dec. 26, 2019

(65) Prior Publication Data
US 2021/0214533 A1    Jul. 15, 2021

(30) Foreign Application Priority Data

Jun. 19, 2018 (EP) .................................... 18178466

(51) Int. Cl.
| C08L 23/06 | (2006.01) |
| C08K 3/04  | (2006.01) |
| C08K 5/45  | (2006.01) |

(52) U.S. Cl.
CPC ............... *C08L 23/06* (2013.01); *C08K 3/04* (2013.01); *C08K 5/45* (2013.01); *C08L 2201/08* (2013.01); *C08L 2203/202* (2013.01); *C08L 2205/025* (2013.01); *C08L 2207/062* (2013.01); *C08L 2310/00* (2013.01)

(58) Field of Classification Search
CPC ............... C08L 23/06; C08L 2201/08; C08L 2203/02; C08L 2205/025; C08L 2207/62; C08L 2310/00; C08L 2203/202; C08L 2205/02; C08L 2207/062; C08L 23/0815; C08K 3/04; C08K 5/45; C08K 5/0041; B41M 5/267; H01B 3/441
USPC ......................................................... 524/84
See application file for complete search history.

(56) References Cited

U.S. PATENT DOCUMENTS

| 4,959,406 A | 9/1990 | Foltin et al. |
| 6,207,344 B1 | 3/2001 | Ramlow et al. |
| 8,206,825 B2 | 6/2012 | Appel et al. |
| 9,637,602 B2 | 5/2017 | Potter et al. |
| 9,670,293 B2 | 6/2017 | Reznichenko et al. |
| 9,670,347 B2 | 6/2017 | Tölsch et al. |
| 9,708,481 B2 | 7/2017 | Wang et al. |
| 9,745,431 B2 | 8/2017 | Potter et al. |
| 9,751,962 B2 | 9/2017 | Wang et al. |
| 9,777,142 B2 | 10/2017 | Sandholzer et al. |
| 9,802,394 B2 | 10/2017 | Cavacas et al. |
| 9,828,698 B2 | 11/2017 | Wang et al. |
| 9,890,275 B2 | 2/2018 | Sandholzer et al. |
| 9,976,020 B2 | 5/2018 | Nummila-Pakarinen et al. |
| 10,011,708 B2 | 7/2018 | Lampela et al. |
| 10,030,109 B2 | 7/2018 | Boragno et al. |
| 10,040,930 B2 | 8/2018 | Gloger et al. |
| 10,100,185 B2 | 10/2018 | Wang et al. |
| 10,100,186 B2 | 10/2018 | Wang et al. |
| 10,227,427 B2 | 3/2019 | Reichelt et al. |
| 10,450,451 B2 | 10/2019 | Wang et al. |
| 10,519,259 B2 | 12/2019 | Resconi et al. |
| 10,870,718 B2 | 12/2020 | Denifl et al. |
| 11,292,900 B2 | 4/2022 | Gahleitner et al. |

(Continued)

FOREIGN PATENT DOCUMENTS

| CN | 101910284 A | 12/2010 |
| CN | 103087377 A * | 5/2013 |

(Continued)

OTHER PUBLICATIONS

Wypych, G., Ed., "Chemical name: 2,5-bis(5-tert-butylbenzooxazol-2-yl)thiophene," Section 4.10, Handbook of UV Degradation and Stabilization, 116-117. (Year: 2011).*
CN 103087377 A., machine translation, EPO espacenet. (Year: 2013).*
China National Intellectual Property Administration, First Office Action in Chinese Patent Application No. 201980037242.9 (dated Jul. 26, 2021).
China National Intellectual Property Administration, Second Office Action in Chinese Patent Application No. 201980037242.9 (dated Jan. 17, 2022).
U.S. Appl. No. 17/413,612, filed Jun. 14, 2021.
*Anthology of Patents in the Field of Plastics*, vol. 1, Shanghai Institute of Science and Technology Information, Shanghai Science and Technology Literature Press, 1st edition, p. 4 (Jun. 1979).

(Continued)

*Primary Examiner* — Frances Tischler
(74) *Attorney, Agent, or Firm* — Leydig, Voit & Mayer, Ltd.

(57) ABSTRACT

The present invention is directed to a polyolefin composition which provides improved contrast of laser marks. It is suitable for many applications where precise marking of a molded article made of a polyolefin composition is required, e.g. as outer layer of a wire or cable or in automotive applications. The polyolefin composition of the present invention comprises a polyolefin, carbon black in an amount of 0.25 to 1.0 wt % and an optical brightener in an amount of 0.001 to 0.1 wt %. The present invention is further directed to a molded article comprising the polyolefin composition of the present invention. Further on, the present invention is directed to the use of the polyolefin composition of the present invention as an outer layer of a cable. Finally, the present invention is directed to a method of inducing print on a molded article by laser printing.

12 Claims, 7 Drawing Sheets

(56) References Cited

U.S. PATENT DOCUMENTS

| | | | |
|---|---|---|---|
| 11,299,617 B2 | 4/2022 | Prieto et al. | |
| 2009/0137445 A1 | 5/2009 | Fabian et al. | |
| 2009/0176093 A1 | 7/2009 | Appel et al. | |
| 2014/0127438 A1 | 5/2014 | Sherman, Jr. et al. | |
| 2016/0185946 A1 | 6/2016 | Sandholzer et al. | |
| 2016/0194486 A1 | 7/2016 | Sandholzer et al. | |
| 2016/0200838 A1 | 7/2016 | Reznichenko et al. | |
| 2016/0208085 A1 | 7/2016 | Gloger et al. | |
| 2016/0229158 A1 | 8/2016 | Cavacas et al. | |
| 2016/0237270 A1 | 8/2016 | Wang et al. | |
| 2016/0244539 A1 | 8/2016 | Resconi et al. | |
| 2016/0272740 A1 | 9/2016 | Wang et al. | |
| 2016/0280899 A1 | 9/2016 | Töltsch et al. | |
| 2016/0304681 A1 | 10/2016 | Potter et al. | |
| 2016/0311951 A1 | 10/2016 | Reichelt et al. | |
| 2016/0311988 A1 | 10/2016 | Potter et al. | |
| 2016/0312018 A1 | 10/2016 | Vestberg et al. | |
| 2016/0312019 A1 | 10/2016 | Lampela et al. | |
| 2016/0347943 A1 | 12/2016 | Wang et al. | |
| 2016/0347944 A1 | 12/2016 | Wang et al. | |
| 2017/0009068 A1 | 1/2017 | Kahlen et al. | |
| 2017/0029980 A1 | 2/2017 | Wang et al. | |
| 2017/0137617 A1 | 5/2017 | Wang et al. | |
| 2017/0152372 A1 | 6/2017 | Quittmann et al. | |
| 2017/0166711 A1 | 6/2017 | Boragno et al. | |
| 2017/0218172 A1 | 8/2017 | Wang et al. | |
| 2017/0313867 A1 | 11/2017 | Lampela et al. | |
| 2017/0321048 A1 | 11/2017 | Nummila-Pakarinen et al. | |
| 2017/0355839 A1* | 12/2017 | Lampela | C08K 5/0083 |
| 2018/0079875 A1 | 3/2018 | Braun et al. | |
| 2018/0194881 A1 | 7/2018 | Denifl et al. | |
| 2020/0263015 A1 | 8/2020 | Kniesel et al. | |
| 2020/0270434 A1 | 8/2020 | Van Houcke et al. | |
| 2020/0277479 A1 | 9/2020 | Jerabek et al. | |
| 2020/0308353 A1 | 10/2020 | Jerabek et al. | |
| 2020/0347216 A1 | 11/2020 | Kniesel et al. | |
| 2020/0392321 A1 | 12/2020 | Gahleitner et al. | |
| 2021/0114352 A1 | 4/2021 | Oderkerk et al. | |
| 2021/0171749 A1 | 6/2021 | Kumar et al. | |
| 2021/0171750 A1 | 6/2021 | Gahleitner et al. | |
| 2021/0214527 A1 | 7/2021 | Gahleitner et al. | |
| 2021/0214533 A1 | 7/2021 | Kulshreshtha et al. | |
| 2021/0238376 A1 | 8/2021 | Kahlen et al. | |
| 2021/0253836 A1 | 8/2021 | Gahleitner et al. | |
| 2021/0269560 A1 | 9/2021 | Krallis et al. | |
| 2021/0324189 A1 | 10/2021 | Prieto et al. | |
| 2021/0332227 A1 | 10/2021 | Wang et al. | |
| 2021/0347971 A1 | 11/2021 | Wang et al. | |
| 2022/0033631 A1 | 2/2022 | Gloger et al. | |
| 2022/0135779 A1 | 5/2022 | Wang et al. | |
| 2022/0204719 A1 | 6/2022 | Vijay | |

FOREIGN PATENT DOCUMENTS

| | | |
|---|---|---|
| CN | 104884524 A | 9/2015 |
| EP | 0 330 869 A1 | 9/1989 |
| EP | 0 710 570 A1 | 5/1996 |
| EP | 0 924 095 A1 | 6/1999 |
| EP | 0 947 352 A1 | 10/1999 |
| EP | 1 162 232 A1 | 12/2001 |
| WO | WO 2017/221102 A1 | 12/2017 |
| WO | WO 2019/243130 A1 | 12/2019 |

OTHER PUBLICATIONS

Liu et al. "Training courses for plastic compounding worker (middle class, senior)," Culture Development Press, 1st Edition, pp. 59-62 (Jan. 2017).
China National Intellectual Property Administration, Third Office Action in Chinese Patent Application No. 201980037242.9 (dated Jun. 22, 2022).
European Patent Office, Extended European Search Report in European Patent Application No. 18178466.1 (Dec. 3, 2018)).
European Patent Office, International Search Report in International Application No. PCT/EP2019/065371 (Sep. 16, 2019).
European Patent Office, Written Opinion in International Application No. PCT/EP2019/065371 (Sep. 16, 2019).
International Bureau of WIPO, International Preliminary Report on Patentability in International Application No. PCT/EP2019/065371 (Dec. 22, 2020).

* cited by examiner

POLYOLEFIN COMPOSITION PROVIDING IMPROVED CONTRAST OF LASER MARKS

CROSS-REFERENCE TO RELATED APPLICATIONS

This patent application is the U.S. national phase of International Application No. PCT/EP2019/065371, filed on Jun. 12, 2019, which claims the benefit of European Patent Application No. 18178466.1, filed Jun. 19, 2018, the disclosures of which are incorporated herein by reference in their entireties for all purposes.

The present invention is directed to a polyolefin composition which provides improved contrast of laser marks. It is suitable for many applications where precise marking of a molded article made of a polyolefin composition is required, e.g. as outer layer of a wire or cable or in automotive applications. The present invention is further directed to a molded article comprising the polyolefin composition of the present invention. Further on, the present invention is directed to the use of the polyolefin composition of the present invention as an outer layer of a cable. Finally, the present invention is directed to a method of inducing print on a molded article comprising the polyolefin composition of the present invention.

Marking of molded articles is a continued need to indicate serial numbers and further information thereon. The skilled person knows suitable methods for marking of molded articles made of polyolefin compositions like those based on polyethylene or polypropylene, e.g. conventional printing techniques like ink jet, embossing etc. In the area of communication and power cables, marking is necessary in order to provide information to the installer, such that the installation is done correctly and efficiently. Similarly, in the automotive field, marking is necessary to provide information about the manufacturer of the molded article since often a particular molded article to be used in e.g. a car is received from more than one supplier. Also several further data is often required on a molded article, e.g. productions dates, expiry dates, bar codes, and company logos.

For many applications, however, conventional printing techniques like ink jet, embossing etc. are not suitable, since the outer surface of the molded article is not sufficient for providing a print using the conventional techniques, or since the shape of the molded article does not allow printing with conventional techniques, e.g. since the relevant part of the surface of the molded article is non-planar.

Therefore, use of laser printing techniques is gaining more importance. In particular for fiber optic micro cables (FOC), conventional printing techniques are not suitable, given the very small outer surface of such micro cables. The increased need for micro cables has accordingly also increased the use of laser printing. One of the advantages of laser printing is that such printing can be performed at higher line speed compared to the alternatives, thus increasing cost-efficiency. Another advantage is that a laser-induced print cannot be erased so easily by rubbing or friction as opposed to ink-jet print. However, with the laser printing technology, there is a challenge of making a good contrast between a dark carbon black filled molded article and a light marking. Hence, use of laser printing additives (LPA) is required.

For cable manufacturers, the in-line mixing of LPA involves an additional step. Therefore, there is a need for a polyolefin composition, which provides better contrast of laser prints and which does not require any additional manufacturing steps.

EP 0 947 352 A1 discloses a method for printing by means of a laser beam a character on an inside of a mono-component recipient closure, said closure being made of a plastic material comprising between 0.10 wt % and 1.5 wt % of a laser beam absorbent additive.

U.S. Pat. No. 6,207,344 B1 discloses a resin composition having laser marking properties comprising a polycarbonate resin, an effective amount of a copper chromite having a spinel structure and up to 0.05 wt % of carbon black, wherein said polycarbonate resin foams in laser struck areas to form light colored markings in the laser struck areas on a dark background.

EP 0 924 095 A1 discloses a method for marking a polyolefin composition comprising irradiating with a YAG laser a polyolefin composition containing 0.1 to 1.0 part by weight of carbon black per 100 parts by weight of the polyolefin composition, wherein the carbon black has an average secondary particle size of not smaller than 150 nm.

US 2017/0152372 A1 discloses microspheres useful as laser-absorbing additive for marking of several polymers like thermoplastic polymers. The microspheres comprise core-shell particles which are dispersed in a polyolefin carrier. The core comprises, as absorber, a mixture made from a bismuth compound and a white pigment and/or pale or white mineral fillers and comprises, as film former, a non-olefinic polymer compound, and the shell comprises at least one compatibilizer.

There is, however, still a need for providing a polyolefin composition which provides improved contrast of laser marks applied by laser printing on molded articles made thereof.

The present invention is based on the finding that the object can be solved by provision of a polyolefin composition comprising an ethylene or propylene homo- or copolymer, carbon black and an optical brightener.

The polyolefin composition according to the present invention has the advantage of providing improved contrast of laser marks applied by laser printing on molded articles made thereof.

Accordingly, the present invention is in one aspect directed to a polyolefin composition comprising (A) a polyolefin,
(B) carbon black in an amount of 0.25 to 1.0 wt % based on the weight of the polyolefin composition, and
(C) an optical brightener in an amount of 0.001 to 0.1 wt % based on the weight of the polyolefin composition.

According to a preferred embodiment of the present invention the polyolefin composition further comprises (D) a UV agent in an amount of 0.1 to 1.0 wt % based on the weight of the polyolefin composition.

It should be noted that in polyolefin compositions of the prior art used as jacketing (outer layer) of fiber optic micro cables (FOC), the amount of carbon black is at least 2.5 wt %. This amount of carbon black is necessary in order to provide sufficient UV stability to the jacketing layer.

The UV agent may be added to compensate the lack of carbon black, i.e. the relatively low amount of carbon black, and accordingly provide sufficient protection against UV light, if required for the particular application of the polyolefin composition of the present invention.

Polyolefin (A)

The polyolefin (A) is preferably selected from the group consisting of an ethylene homopolymer, an ethylene copolymer, a propylene homopolymer, a propylene copolymer, a blend of an ethylene homopolymer and an ethylene copolymer, and a blend of a propylene homopolymer and a propylene copolymer.

The ethylene homopolymer, the ethylene copolymer, the propylene homopolymer, and the propylene copolymer may consist of more than one homopolymer or copolymer, respectively, i.e. two homopolymers differing in the molecular weight distribution, two copolymers differing in the molecular weight distribution and/or differing in the content and/or type of comonomer. The same counts for the homopolymer and the copolymer in the blends. Further on, in these blends also the homopolymer and the copolymer may differ in the molecular weight distribution.

The terms "ethylene homopolymer" and "propylene homopolymer" as used herein relate to a polyethylene or polypropylene, respectively, that consists substantially, i.e. of at least 99.5 wt %, more preferably of at least 99.8 wt %, of ethylene or propylene units, respectively. In a preferred embodiment only ethylene or propylene units, respectively, are used in polymerization. In a preferred embodiment only ethylene or propylene units, respectively, are detectable in the ethylene homopolymer or propylene homopolymer, respectively. The comonomer content can be determined with $^{13}C$ NMR spectroscopy.

The term "copolymer" as used herein covers polymers obtained from co-polymerisation of at least two, i.e. two, three or more different monomers, i.e. the term "copolymer" as used herein does e.g. not exclude so-called terpolymers obtained from co-polymerisation of three different monomers.

The content of the polyolefin (A) in the polyolefin composition of the present invention is usually at least 90 wt %, preferably at least 95 wt %, more preferably at least 98 wt %, and still more preferably at least 98.5 wt %. The content of the polyolefin (A) in the polyolefin composition of the present invention is usually not higher than 99.5 wt %.

Suitable ethylene homopolymers are low density polyethylene (LDPE, density of 0.910-0.940 g/cm$^3$) and high density polyethylene (HDPE, density of at least 0.941 g/cm$^3$). The latter is preferred for cable applications.

The melt flow rate of suitable ethylene homopolymers is preferably 0.2 to 3.0 g/10 min, more preferably 0.2 to 2.0 g/10 min.

Suitable ethylene copolymers are linear low density polyethylene (LLDPE, density of 0.915-0.925 g/cm$^3$) and very low density polyethlylene (VLDPE, density of 0.880-0.915 g/cm$^3$). Suitable comonomers are $C_3$-$C_{12}$-alpha-olefins, preferably 1-butene, 1-hexene, 4-methyl-1-pentene, and/or 1-octene.

Suitable propylene homopolymers are high isotactic propylene homopolymers. Suitable propylene copolymers are copolymers, i.e. random and block copolymers, with ethylene and/or a $C_4$-$C_{12}$-alpha-oelfin, preferably with ethylene, 1-butene, 1-hexene, 4-methyl-1-pentene, and/or 1-octene. Suitable propylene copolymers include impact copolymers having a matrix which is a propylene homopolymer or a propylene random copolymer having dispersed therein an ethylene-propylene rubber (EPR).

The polyolefin (A) may be unimodal or bimodal.

Preferably, the polyolefin (A) of the present invention is bimodal, more preferably the polyolefin of the present invention is multimodal polyethylene consisting of a low-molecular weight ethylene homopolymer mixed with a high-molecular weight copolymer of ethylene and butene, 4-methyl-1-pentene, 1-hexene, or 1-octene.

For cable applications, a suitable polyolefin (A) according to the present invention is a polyolefin having properties required in the technical area of jacketing, i.e. a polyolefin providing low shrinkage, high Environmental Stress Crack Resistance (ESCR) and low Flexural Modulus. Thus, the polyolefin (A) of the present invention preferably has the following ESCR properties: F10>1500 h, more preferably >8000 h; F1>700 h, more preferably >3000 h. In this regard, the polyolefin (A) according to the present invention may be high density polyethylene (HDPE) or polypropylene.

Carbon Black (B)

The skilled person knows carbon black as additive in polyolefin compositions.

The polyolefin composition according to the present invention comprising 0.25-1.0 wt % carbon black provides a light-coloured visible marking with good contrast towards dark background of black colour. It is believed that the irradiation from the laser beam decomposes the carbon black into volatile components. These volatile components as well as the absorption of heat from the laser beam foam the surface, which scatters light and leaves a light-colored impression. The polyolefin composition according to the present invention comprising carbon black in the range varying from 0.25 to 1.0 wt % exhibits a superior performance for laser marking. In the presence of a higher amount of carbon black, laser marking efficiency deteriorates, and when the amount of carbon black is above 1.0 wt %, poor contrast is achieved.

Preferably, the amount of carbon black in the polyolefin composition is 0.25-0.75 wt %, more preferably 0.25-0.5 wt %.

According to the present invention, carbon black may be added in the form of a masterbatch, wherein carbon black is dispersed in a suitable matrix, such as a polyolefin matrix. Alternatively, carbon black may be added directly.

UV Agent (D)

As mentioned above, it has been noted that at rather low carbon black loadings, e.g. loadings below 2.5 wt %, degradation of the base resin (polyolefin) caused by UV irradiation may occur. This is e.g. known from polyolefin compositions forming the outer layer of fiber optic micro cables (FOC). In case of exposure to UV light, this problem may be addressed by providing a polyolefin composition comprising a UV-absorbing agent along with an optimum amount of carbon black.

The amount of UV agent is suitably 0.1-1.0 wt %, preferably 0.2-0.5 wt %, and most preferably 0.2-0.3 wt %, based on the weight of the polyolefin composition.

Suitable UV agents are benzoates, triazoles, triazines or hindered amines. Particularly, a mixture of equal amounts of dimethyl succinate polymer with 4-hydroxy-2,2,6,6,-tetramethyl-1-piperidineethanol and poly[[6-[(1,1,3,3-tetramethylbutyl)amino]-1,3,5-triazine-2,4-diyl][(2,2,6,6-tetramethyl- 4-piperidinyl)imino]-1,6-hexanediyl[(2,2,6,6-tetramethyl-4-piperidinyl)imino]]) (Tinuvin 783 FDL, commercially available from BASF) may be used as UV-agent.

Optical Brightener (C)

Optical brighteners are known to the skilled person and are chemical compounds that absorb light in the ultraviolet and violet region of the electromagnetic spectrum, i.e. around 300-430 nm, and re-emit light in the violet and blue region by fluorescence, i.e. around 400-500 nm.

Optical brighteners which are usable according to the present invention are e.g. those which belong to the class represented by 4,4'-bis(2-benzoxazolyl)stilbene and its derivatives, like those having alkyl substituents on the aromatic rings, and those which belong to the class represented by 2,5-bis(benzoxazol-2-yl)thiophene and its derivatives, like those having alkyl substituents on the aromatic rings. Further optical brighteners are disclosed in paragraph [0004] of US 2009/0137445 A1. A particular preferred optical brightener is 2,5-bis(5-tert-butyl-benzoxazol-2-yl)thiophene which is also known as 2,5-thiophenediylbis(5-tert-butyl-1,3-benzoxazole) (CAS-Nr. 7128-64-5).

Other known optical brighteners which may be used alternatively or additionally are those disclosed in US 2009/0137445 A1, i.e. inorganic optical brighteners based on so-called inorganic phosphors, i.e. synthetically produced crytalline compounds preferably having a particle size distribution of from 0.01 to 20 μm, wherein said inorganic phosphors are preferably selected from the group consisting of sulfides and selenides, oxysulfides, oxygen-dominant phosphors and halide phosphors, more preferably selected from the group consisting of $BaMgAl_{10}O_{17}:Eu$, $BaMg_2Al_{16}O_{27}:Eu$, $Sr_3Ca_2(PO_4)_3Cl:Eu$ and $(SrBaCa)_5(PO_4)_3Cl:Eu$, wherein the content of europium is from 0.1 to 0.5 mole %.

As indicated above, the optical brightener is present in an amount of 0.001 to 0.1 wt % based on the weight of the polyolefin composition, preferably 0.001 to 0.05 wt %, more preferably 0.001 to 0.03 wt %, still more preferably 0.003 to 0.03 wt %.

Polyolefin Composition

The polyolefin composition of the present invention may have a density of 0.915 to 0.955 $g/cm^3$, preferably 0.920 to 0.950 $g/cm^3$.

The polyolefin composition of the present invention may comprise further usual additives, preferably in a total amount of not more than 5 wt % in total, i.e. the sum of the contents of polyolefin (A), carbon black (B), and optical brightener (C), or in the preferred embodiment mentioned above, the sum of the contents of polyolefin (A), carbon black (B), optical brightener (C), and UV agent (D), is preferably at least 95 wt % based on the weight of the polyolefin composition of the present invention.

The polyolefin composition according to the present invention may further comprise an antioxidant, such as sterically hindered phenol, phosphorus-based antioxidant, sulphur-based antioxidant, nitrogen-based antioxidant, or mixtures thereof. In particular, a mixture of equal amounts of pentaerythritol tetrakis(3-(3,5-di-tert-butyl-4-hydroxyphenyl)propionate) and tris(2,4-di-tert-butylphenyl)phosphite (Irganox B225) may be used as antioxidant.

The polyolefin composition according to the present invention may further comprise an antistatic agent, such as calcium stearate, sodium stearate or zinc stearate.

Molded Article

The present invention is in a further aspect directed to a molded article comprising, preferably consisting of, the polyolefin composition of the present invention as described above including all preferred embodiments.

Suitable molded articles are e.g. automotive parts or outer layers of a wire or cable, e.g. of a power or communication wire or cable.

According to a particular preferred embodiment, the molded article according to the present invention is an outer layer of a wire or cable, in particular of a fiber optic micro cable (FOC), i.e. a cable jacket.

The present invention is in a further aspect directed to a cable comprising an outer layer comprising, preferably consisting of, the polyolefin composition of the present invention as described above including all preferred embodiments.

Laser Printing

The present invention is in a further aspect directed to a method of inducing print on a molded article, preferably an outer layer of a cable, wherein said molded article comprises, preferably consists of, a polyolefin composition of the present invention as described above including all preferred embodiments, said print being induced by laser radiation.

A suitable laser according to the present invention is any conventional laser that may be used for inducing print. Such lasers are well known to a person skilled in the art. The frequency of the laser may be 20-100 kHz, and the power may be 2-50 W, preferably 3-20 W, more preferably 4.5-13 W.

By using the polyolefin composition of the present invention as the outer layer of a cable, in particular of a fiber optic micro cable (FOC), a clear and distinct print is obtained by laser printing without the need of adding print enhancers, resulting in a superior and cost-efficient production process and eliminating the shortcomings of the prior art. These advantages are also applicable for other molded articles.

Use of Polyolefin Composition

The present invention is in a further aspect directed to the use of a polyolefin composition of the present invention as described above including all preferred embodiments, as an outer layer of a cable.

In the following the present invention is further illustrated by means of examples.

EXAMPLES

1. Definitions/Measuring Methods

The following definitions of terms and determination methods apply for the above general description of the invention as well as to the below examples unless otherwise defined.

Density

Density is measured according to ISO 1183-1—method A (2004). Sample preparation is done by compression moulding in accordance with ISO 1872-2:2007.

Flexural Modulus

Flexural modulus was determined according to ISO 178: 2010/Amd.1:2013.

Melt Flow Rate

Melt flow rate $MFR_2$ of polyethylene was determined according to ISO 1133 at 190° C. under a load of 2.16 kg. Melt flow rate $MFR_2$ of polypropylene was determined according to ISO 1133 at 230° C. under a load of 2.16 kg.

Light Intensity

Light intensity of the samples (squares) is determined as follows. The method is also described in general in the co-pending international patent application PCT/EP2019/065328.

Images were collected with a Keyence VHX-5000 microscope with objective 50×, namely Z20:X50. Exposure time was fixed at 14 ms, which in this kind of microscopes univocally identifies the settings of the lighting to be used. In particular, the standard LED ring provided with the microscope was used. The images were collected in monochromatic manner, i.e. black&white, in order to have an image with a unique intensity value. A diffuser should not be used. The additional settings in the microscope software, e.g. contrast or sharpness increasers or amplifiers were all set off as this can change the images in an uncontrolled manner. For each setting of the laser printing, a square of 500×500 pixels$^2$ was selected, well inside the printed area. The histogram of the distribution of the intensity was subsequently calculated, and treated with a median filter 3 in order to smoothen its shape. This distribution was fitted with a Gaussian curve, and the center of this Gaussian curve was recorded for each square.

2. Examples

The following materials and compounds are used in the Examples.

PE1 poly(ethylene-co-(1-butene)) copolymer having a density of 963 kg/m$^3$, an MFR$_2$ of 12 g/10 min, mixed with 39 wt % of carbon black (CB)

PE2 bimodal high density polyethylene (HDPE) having a density of 944 kg/m$^3$, an MFR$_2$ of 1.7 g/10 min, a flexural modulus of 850 MPa, commercially available as Borstar HE6068 from Borealis AG Optical brightener 2,5-thiophenediylbis(5-tert-butyl-1,3-benzoxazole), commercially available as Tinopal OB CO from BASF SE UV agent Tinuvin 783 FDL commercially available from BASF SE Antioxidant Irganox B225 commercially available from BASF SE Antistatic agent calcium stearate commercially available as Ceasit SW from Baerlocher GmbH PE2 is used as base resin and contains already 0.2 wt % of the antioxidant, 0.15 wt % of the antistatic agent and 0.3 wt % of the UV agent.

Three samples were prepared using PE1 as the carbon black masterbatch (MB), wherein PE1 was compounded with the base resin PE2 in an amount such that the amount of carbon black in the final composition is 0.5 wt % for each of the three samples (see Table 1). In the sample of the comparative example CE1 no optical brightener is added. In the samples of the inventive examples IE1 and IE2 optical brightener is added.

Compounding was implemented on ZSK 18 MEGAlab laboratory twin screw extruder under the following conditions: speed 200 rpm; melt temperature 175-190° C.; pressure 45-50 bar; output 5 kg/h. Plaques of size 150×80×3 mm were produced from the resulting composition using injection moulding on Engel ES 700H/80V/700H/250 3K machine under following conditions: injection speed 11 mm/s; injection time 3.4 sec; switching pressure 66 bar; holding time during backpressure 15 sec; cooling time 20 sec; cycle time 45 sec; melt temperature 150° C.; mould temperature 50° C.

TABLE 1

Compositions of examples

| Constituents/wt % | CE1 | IE1 | IE2 |
|---|---|---|---|
| PE2 | 98.75 | 98.74 | 98.745 |
| PE1 | 1.25 | 1.25 | 1.25 |
| Optical brightener | – | 0.01 | 0.005 |
| UV agent | + | + | + |
| Antioxidant | + | + | + |
| Antistatic agent | + | + | + |

"+" indicates the presence of these compounds in PE2

Laser marking was carried out using Laser machine, "SpeedMarker 700, 20 W Fiber laser". For marking, a frequency range of 20-100 kHz and a power varying between 5-70% of 20 W was used. Speed was kept constant at 2000 mm/s.

Figure 1:
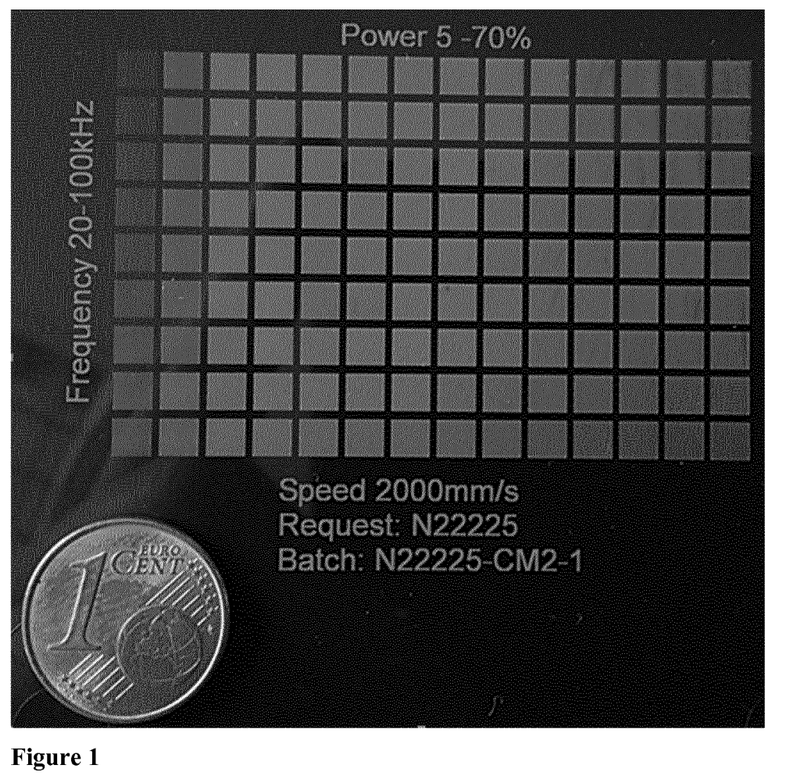
FIG. 1 depicts a laser printed sample in accordance with comparative example CE1.
Figure 2:
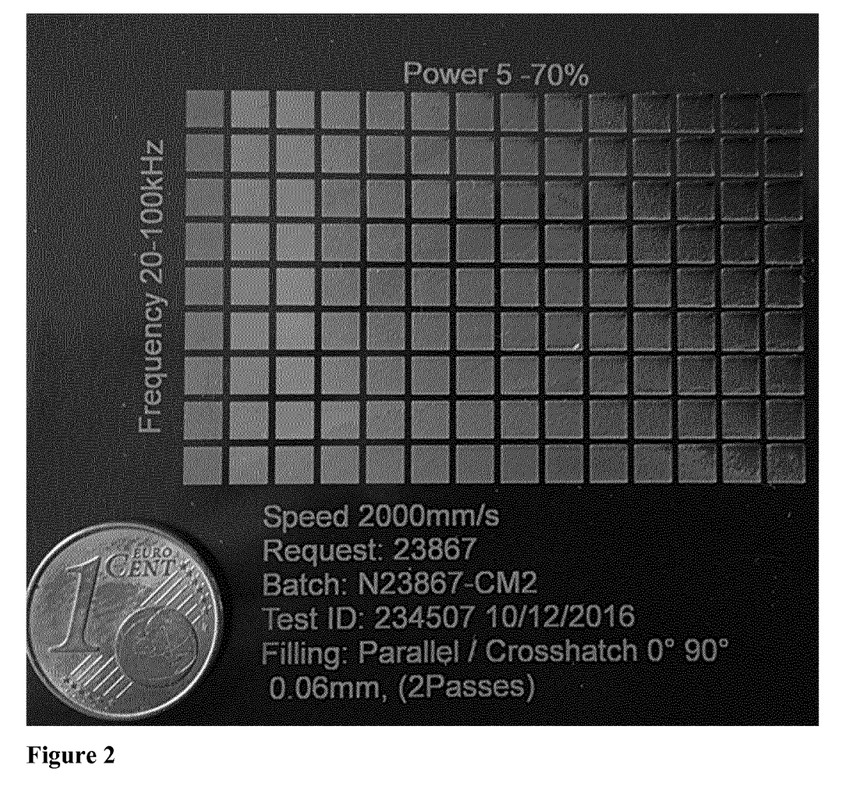
FIG. 2 depicts a laser printed sample in accordance with inventive example E1.
Figure 3:
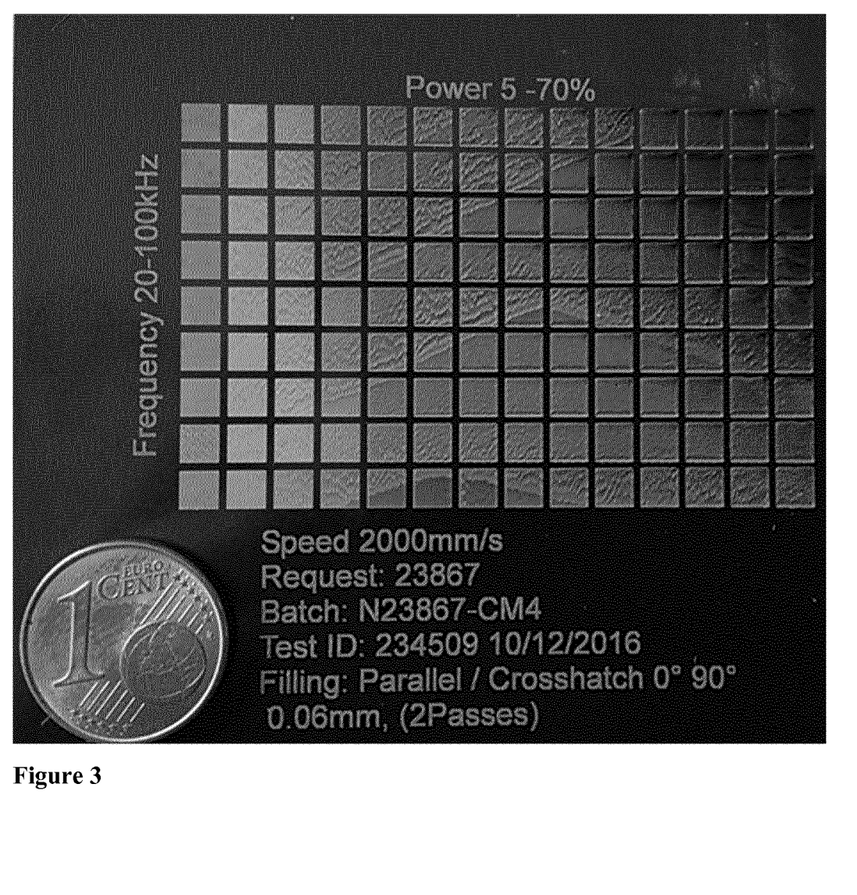
FIG. 3 depicts a laser printed sample in accordance with inventive example E2.

FIGS. 1-3 show the laser printed samples (laser pass: 2 passes). FIG. 1 shows CE1, FIG. 2 shows IE1, FIG. 3 shows IE2.

Each square represents a combination of frequency to power of the ranges indicated above. The samples are assessed visually by a human being. High contrast quality is achieved in the presence of the optical brightener in an amount of 0.01 wt % (FIG. 2, IE1), however, contrast quality is already good in the presence of the optical brightener in an amount of 0.005 wt % (FIG. 3, IE2). The samples according to the present invention have a brighter appearance and accordingly a higher contrast in view of the black background.

Figure 4:
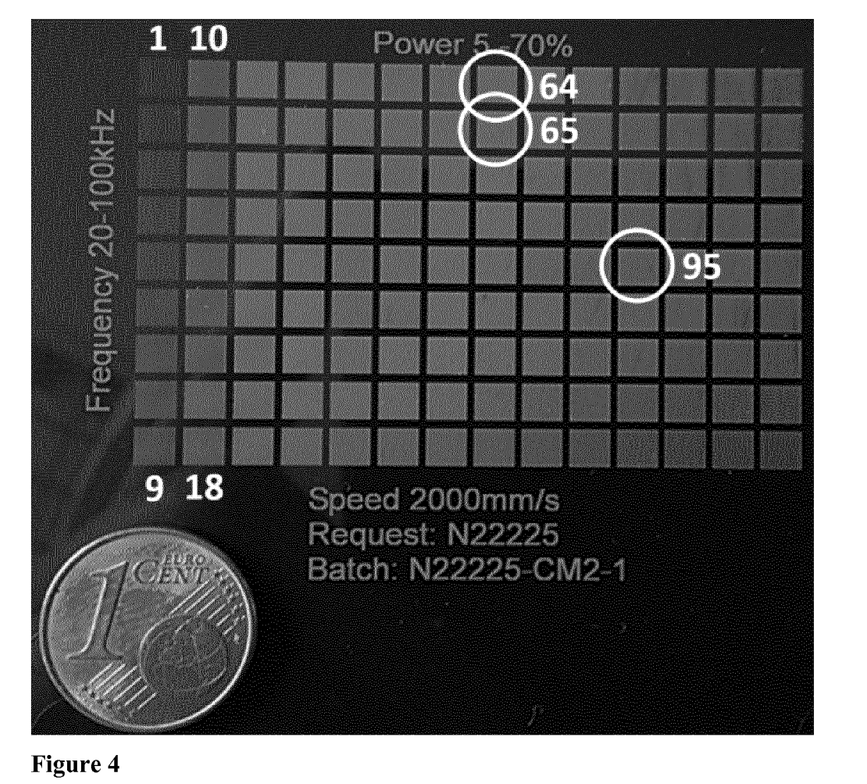
FIG. 4 depicts the result of light intensity measurement on the sample of CE1 depicted in FIG. 1.
Figure 5:
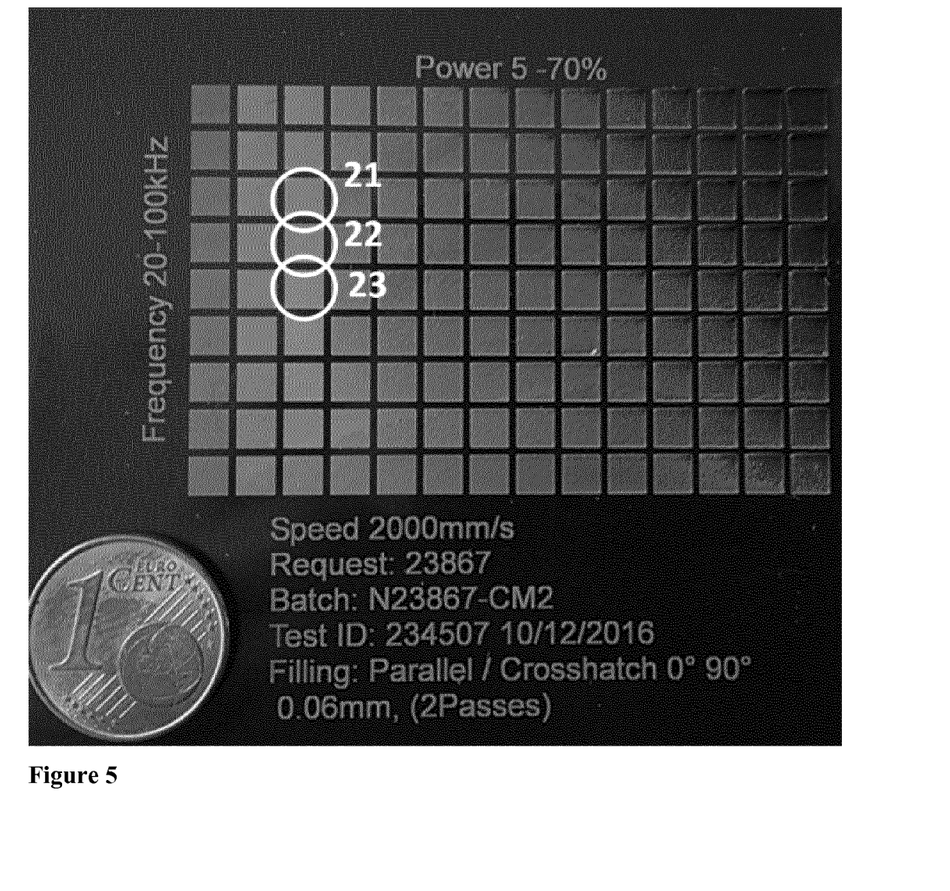
FIG. 5 depicts the result of light intensity measurement on the sample of E1 depicted in FIG. 2.
Figure 6:
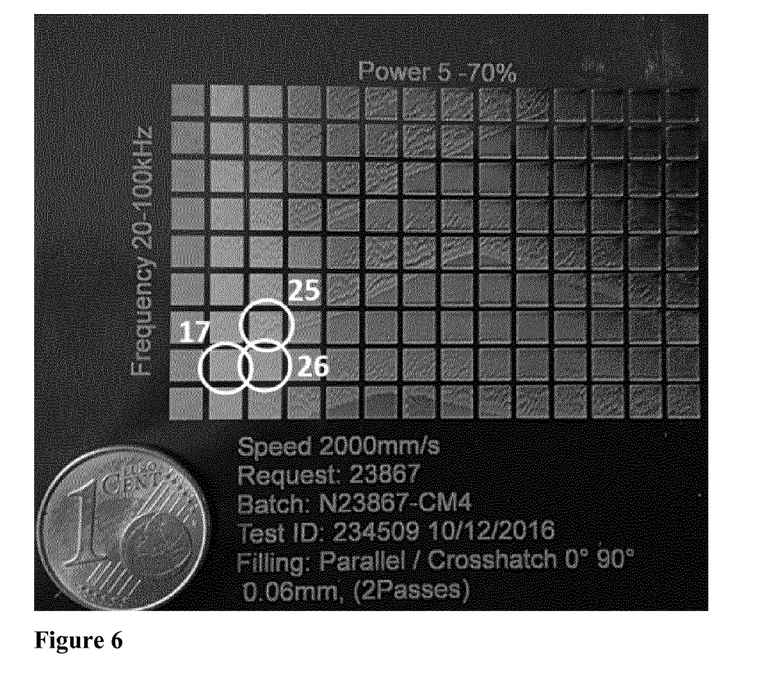
FIG. 6 depicts the result of light intensity measurement on the sample of E2 depicted in FIG. 3.

In addition, the light intensity of the samples is assessed by an objective measurement method as described above. The result is that the samples according to the present invention have a higher light intensity and accordingly a higher contrast in view of the black background. The results of light intensity for the squares with the highest light intensity of all three samples CE1, IE1, and IE2, respectively, are given in Table 2 below. The squares are numbered in Table 2 and the numbering is indicated in the corresponding FIGS. 4 to 6 which correspond to FIGS. 1 to 3 apart from indicating the numbering of the squares. Accordingly, FIG. 4 shows CE1, FIG. 5 shows IE1, FIG. 6 shows IE2.

TABLE 2

Measured light intensities of individual squares with highest light intensity

| Example/square no. | Intensity |
|---|---|
| CE1/64 | 143 |
| CE1/65 | 139 |
| CE1/95 | 139 |
| IE1/21 | 173 |
| IE1/22 | 179 |
| IE1/23 | 181 |
| IE2/17 | 172 |
| IE2/25 | 178 |
| IE2/26 | 172 |

Figure 7:
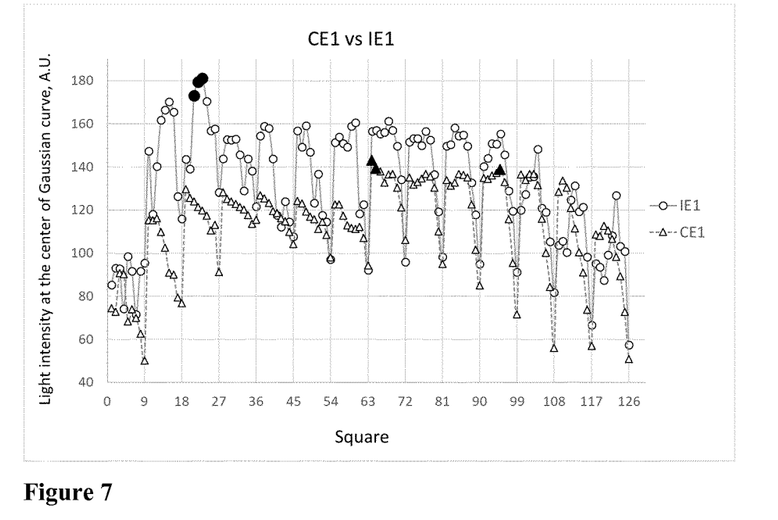
FIG. 7 shows a comparison of IE1 with CE1.
Figure 8:
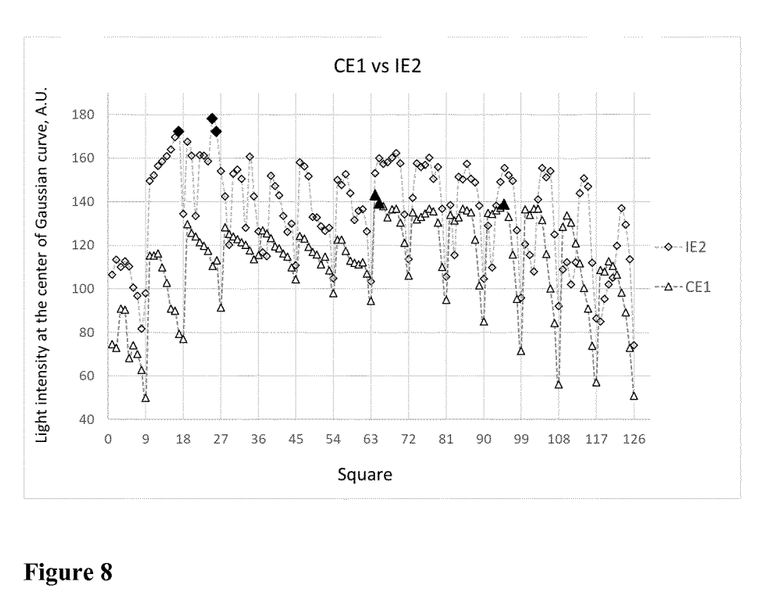
FIG. 8 shows a comparison of IE2 with CE1.

Furthermore, the results of the objective measurement method are also indicated in FIGS. 7 and 8 for all squares. FIG. 7 shows a comparison of IE1 with CE L1. FIG. 8 shows a comparison of IE2 with CE1. The points on graph with the highest light intensity are marked black.

What can be derived from these results is that the light intensity is higher in the inventive examples IE1 and IE2 compared to the comparative example CE1.

The invention claimed is:

1. A polyolefin composition comprising
   (A) a polyolefin in an amount of at least 90 wt % based on the weight of the composition, wherein the polyolefin is selected from the group consisting of
      A1) high density polyethylene (HDPE),
      A2) polypropylene,
      A3) a propylene copolymer, which is a copolymer of propylene and ethylene, a copolymer of propylene and a $C_4$-$C_{12}$-alpha-olefin, or a copolymer of propylene, ethylene, and a $C_4$-$C_{12}$-alpha-olefin, and
      A4) an ethylene copolymer, which is a copolymer of ethylene and a $C_3$-$C_{12}$-alpha-olefin,
   (B) carbon black in an amount of 0.25 to 1.0 wt % based on the weight of the polyolefin composition, and
   (C) an optical brightener in an amount of 0.001 to 0.1 wt % based on the weight of the polyolefin composition.

2. The polyolefin composition according to claim 1, wherein the amount of carbon black is 0.25-0.75 wt % based on the weight of the polyolefin composition.

3. The polyolefin composition according to claim 1, wherein the amount of the optical brightener is 0.001 to 0.05 wt % based on the weight of the polyolefin composition.

4. The polyolefin composition according to claim 1, wherein the optical brightener is 2,5-thiophenediylbis(5-tert-butyl-1,3-benzoxazole).

5. The polyolefin composition according to claim 1, wherein said composition further comprises
   (D) a UV agent in an amount of 0.1 to 1.0 wt % based on the weight of the polyolefin composition.

6. A molded article comprising a polyolefin composition according to claim 1.

7. The molded article according to claim 6, wherein the molded article is an outer layer of a cable.

8. A cable comprising an outer layer according to claim 7.

9. A method of inducing a print on a molded article, the molded article comprising a polyolefin composition according to claim 1, the method comprising inducing said print by laser radiation.

10. The polyolefin composition according to claim 1, wherein the polyolefin composition comprises polyolefin (A) in an amount of at least 95 wt % based on the weight of the composition.

11. The polyolefin composition according to claim 1, wherein the polyolefin composition comprises polyolefin (A) in an amount of at least 98 wt % based on the weight of the composition.

12. The polyolefin composition according to claim 1, wherein the optical brightener is a chemical compound that absorbs light and re-emits light by fluorescence.

* * * * *